US012248881B2

(12) United States Patent
Yang et al.

(10) Patent No.: US 12,248,881 B2
(45) Date of Patent: Mar. 11, 2025

(54) ANNOTATING HIGH DEFINITION MAP DATA WITH SEMANTIC LABELS

(71) Applicant: NVIDIA Corporation, Santa Clara, CA (US)

(72) Inventors: Lin Yang, San Carlos, CA (US); Xiaqing Wu, Foster City, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/467,300

(22) Filed: Sep. 14, 2023

(65) Prior Publication Data

US 2024/0005167 A1 Jan. 4, 2024

Related U.S. Application Data

(63) Continuation of application No. 16/920,126, filed on Jul. 2, 2020, now abandoned.
(Continued)

(51) Int. Cl.
*G06N 3/084* (2023.01)
*B60W 40/02* (2006.01)
*G06N 20/00* (2019.01)
*G06V 10/44* (2022.01)
(Continued)

(52) U.S. Cl.
CPC .............. *G06N 3/084* (2013.01); *B60W 40/02* (2013.01); *G06N 20/00* (2019.01); *G06V 10/454* (2022.01);
(Continued)

(58) Field of Classification Search
CPC ........ G06N 3/045; G06N 3/084; G06N 20/00; B60W 40/02; B60W 2420/408; B60W 2420/403; B60W 2556/40; G06V 10/82; G06V 10/454; G06V 20/56; G06V 20/68; G06V 30/412

See application file for complete search history.

(56) References Cited

U.S. PATENT DOCUMENTS 6,728,689 B1 * 4/2004 Drissi ..................... G06F 18/40
706/14
2017/0039436 A1 2/2017 Chen et al.
(Continued)

OTHER PUBLICATIONS

International Search Report and Written Opinion issued in corresponding application No. PCT/US2020/040789, dated Sep. 11, 2020.
(Continued)

*Primary Examiner* — Aaron L Troost
(74) *Attorney, Agent, or Firm* — Maschoff Brennan

(57) ABSTRACT

According to an aspect of an embodiment, a method may include obtaining multiple sets of camera images and light detection and ranging (LIDAR) point clouds along a track within a geographic sector of a map. The method may include applying a learning model to the camera images to characterize objects within the camera images within classes of objects to generate segmented images. The method may additionally include mapping the sets of camera images and the LIDAR point clouds to three dimensional points of the geographic sector of the map. The method may also include projecting the three dimensional points onto the segmented images to obtain corresponding classes for the three dimensional points of the geographic sector of the map.

20 Claims, 16 Drawing Sheets

Related U.S. Application Data

(60) Provisional application No. 62/869,697, filed on Jul. 2, 2019.

(51) Int. Cl.
  *G06V 10/82* (2022.01)
  *G06V 20/56* (2022.01)
  *G06V 20/58* (2022.01)
  *G06V 30/412* (2022.01)

(52) U.S. Cl.
  CPC .............. *G06V 10/82* (2022.01); *G06V 20/56* (2022.01); *G06V 20/58* (2022.01); *G06V 30/412* (2022.01); *B60W 2420/408* (2024.01)

(56) References Cited

U.S. PATENT DOCUMENTS

| | | |
|---|---|---|
| 2017/0116353 A1 | 4/2017 | Loss |
| 2018/0150727 A1* | 5/2018 | Farooqi .................... G06T 7/50 |
| 2018/0188038 A1 | 7/2018 | Hasberg et al. |
| 2018/0232947 A1 | 8/2018 | Nehmadi et al. |
| 2018/0314921 A1* | 11/2018 | Mercep ................... G01S 15/86 |
| 2019/0086546 A1 | 3/2019 | Tsishkou et al. |
| 2019/0113927 A1* | 4/2019 | Englard ................ G06F 16/285 |
| 2019/0137287 A1* | 5/2019 | Pazhayampallil ... G05D 1/0291 |
| 2019/0258737 A1 | 8/2019 | Wang et al. |
| 2020/0114509 A1* | 4/2020 | Lee ........................ G01S 15/931 |
| 2020/0126237 A1 | 4/2020 | Pfeiffer |
| 2020/0193195 A1 | 6/2020 | Doria et al. |
| 2020/0278217 A1 | 9/2020 | Ahmad et al. |
| 2020/0363215 A1 | 11/2020 | Rusignola et al. |

OTHER PUBLICATIONS

Wu et al., "Squeezeseg: Convolutional Neural Nets with Recurrent CRF for Real-Time Road-Object Segmentation from 3D LIDAR Point Cloud", arXiv:1710.07368v1, Dated Oct. 17, 2017.

* cited by examiner

ANNOTATING HIGH DEFINITION MAP DATA WITH SEMANTIC LABELS

CROSS-REFERENCE TO A RELATED APPLICATION

This patent application is a continuation of U.S. application Ser. No. 16/920,126 filed on Jul. 2, 2020, which claims the benefit of and priority to U.S. Provisional App. No. 62/869,697 filed Jul. 2, 2019, both of which are incorporated by reference in the present disclosure in their entireties.

FIELD

The embodiments discussed herein are related to maps for autonomous vehicles, and more particularly to annotating high definition (HD) map data with semantic labels.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining multiple sets of camera images and light detection and ranging (LIDAR) point clouds along a track within a geographic sector of a map. The method may include applying a learning model to the camera images to characterize objects within the camera images within classes of objects to generate segmented images. The method may additionally include mapping the sets of camera images and the LIDAR point clouds to three dimensional points of the geographic sector of the map. The method may also include projecting the three dimensional points onto the segmented images to obtain corresponding classes for the three dimensional points of the geographic sector of the map.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
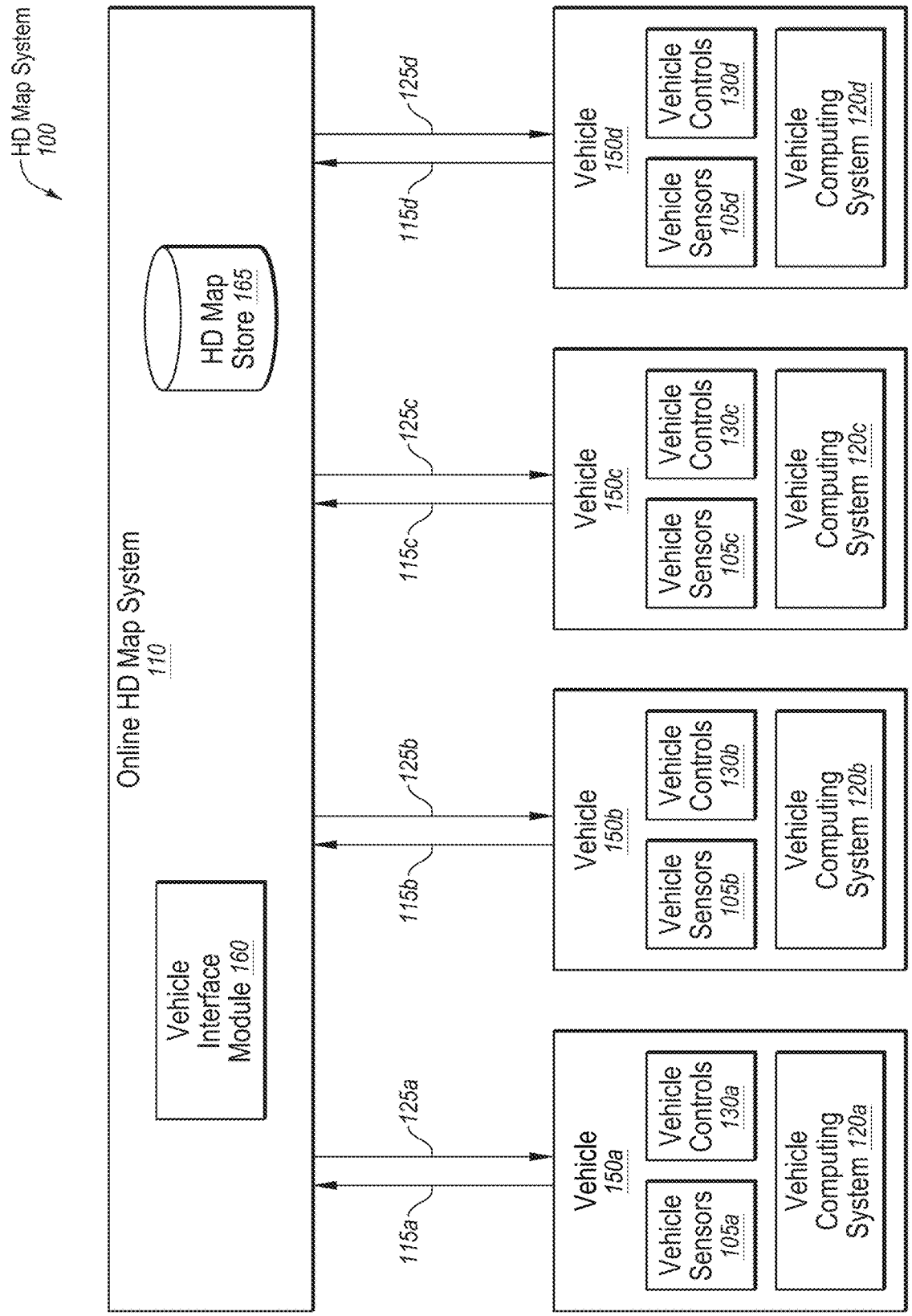
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure relate to classification of objects within an HD map. For example, each three dimensional point in the HD map may have certain data associated therewith, such as a set of coordinates identifying the location in three dimensional space, a color, a LIDAR intensity, etc. In some embodiments of the present disclosure, the three dimensional points may each have a semantic label associated therewith. The semantic label may be determined by applying a learning model to sensor data such as camera images and/or LIDAR points. By classifying the camera images and/or LIDAR points as certain objects, the same object classification may be projected onto the three dimensional points of the HD map such that some or all of the three dimensional points may have a corresponding semantic label (e.g., that a given three dimensional point is a road, a tree, vegetation, sidewalk, etc.).

By providing such semantic labels, a vehicle utilizing the HD map may be better equipped to identify its location within the context of the HD map. Additionally or alternatively, such labels may permit the removal of dynamic objects (e.g., people, cars, etc.) from the HD map.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120*a-d*) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
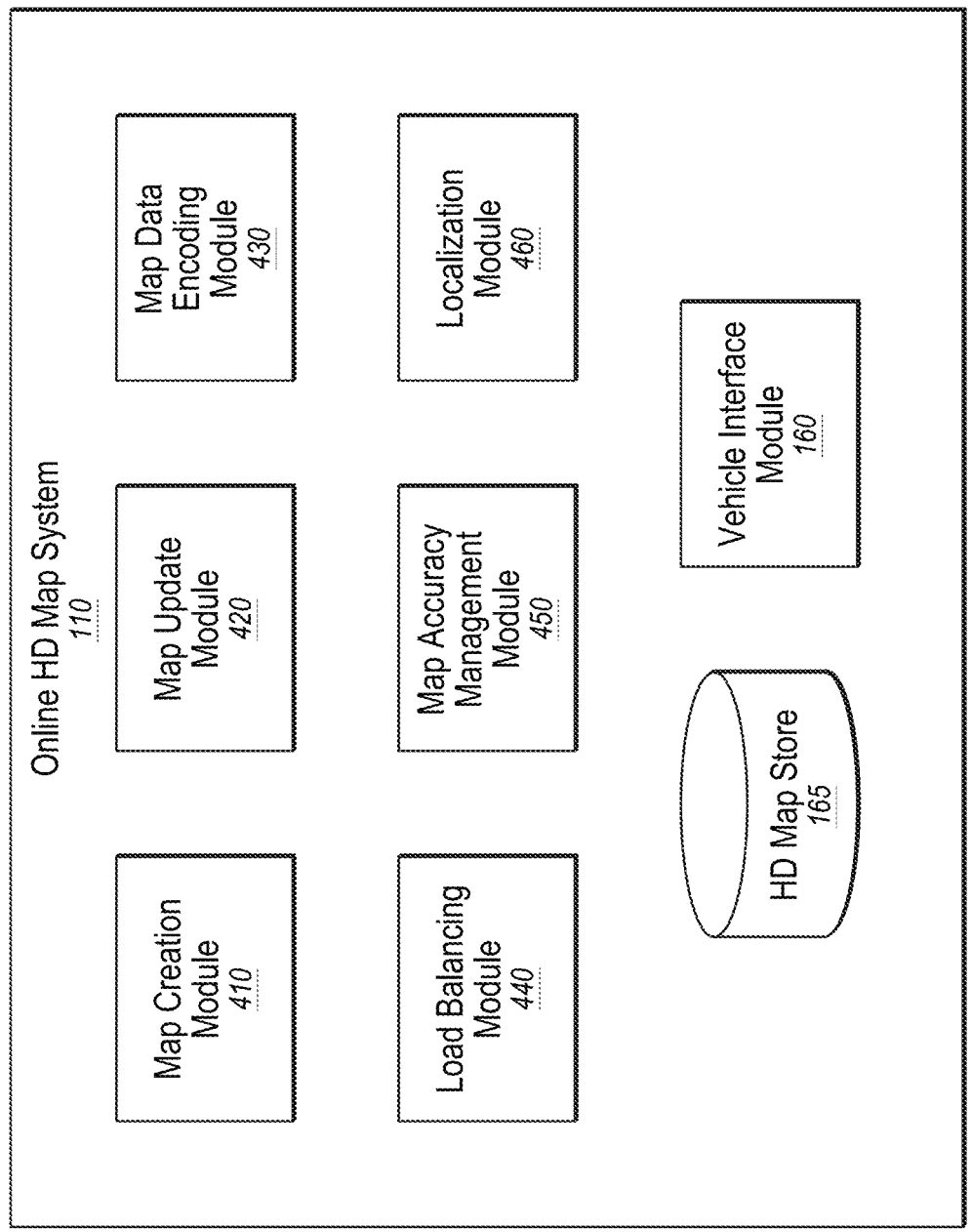
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105*a-d*), vehicle controls 130 (e.g., vehicle controls 130*a-d*), and a vehicle computing system 120 (e.g., vehicle computer systems 120*a-d*). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
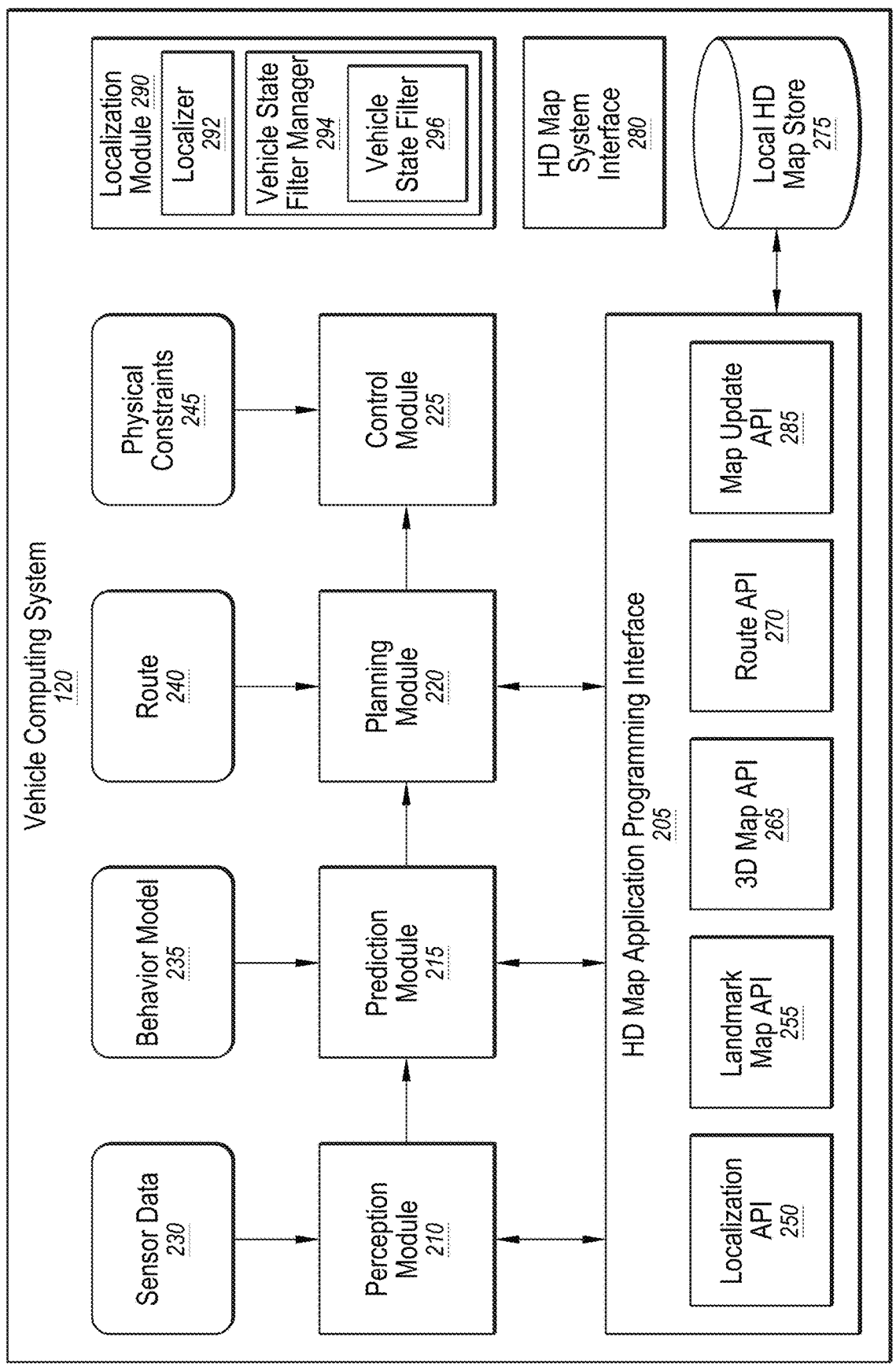
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a localization module 290 (which may include a localizer 292, a vehicle state filter manager 294, and a vehicle state filter 296), a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up-to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up-to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
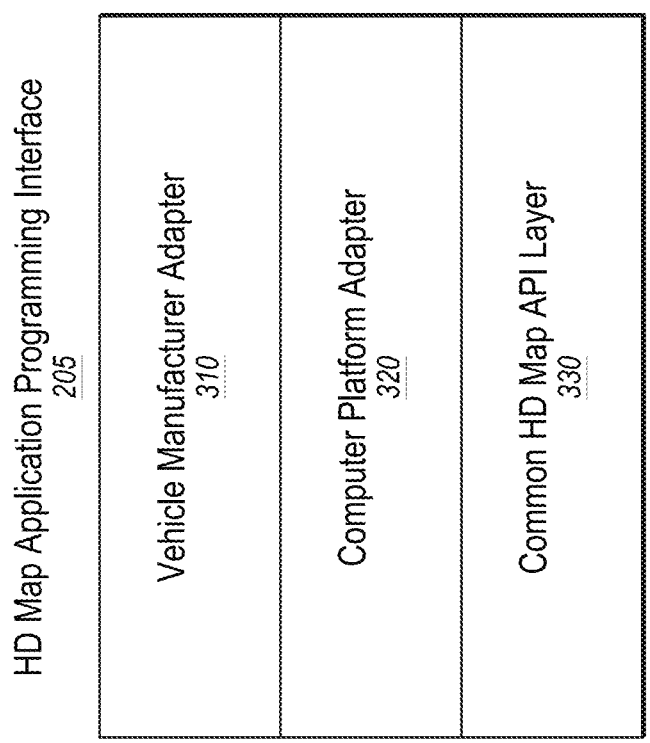
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The localization module 460 may be configured to perform actions similar to those performed by the localization module 290 of FIG. 2.

Figure 5:
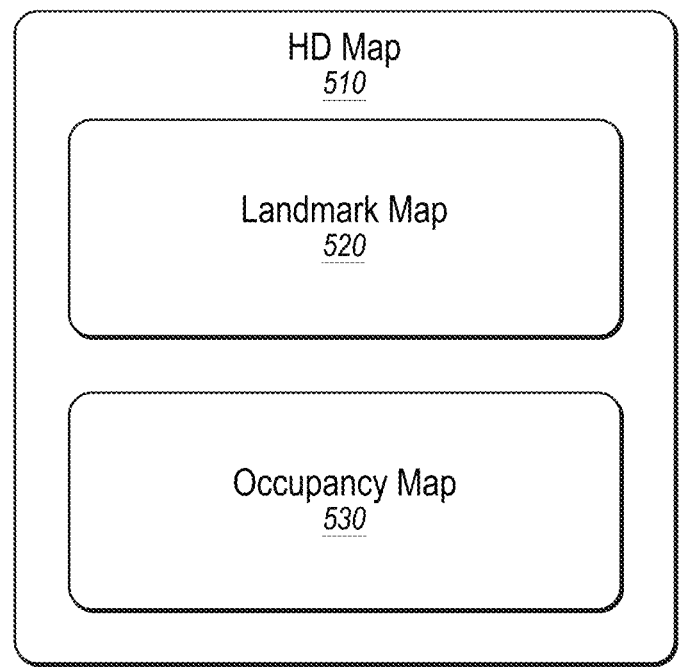
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
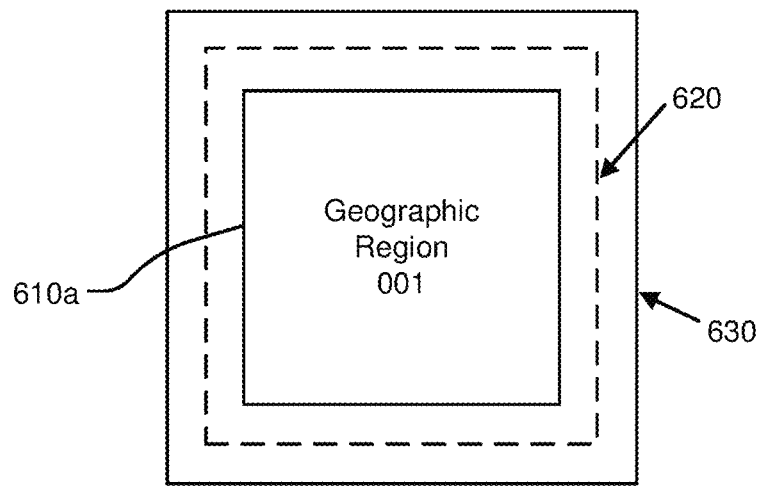
FIGS. 6A-6B illustrate example geographical regions defined in an HD map.
Figure 6B:
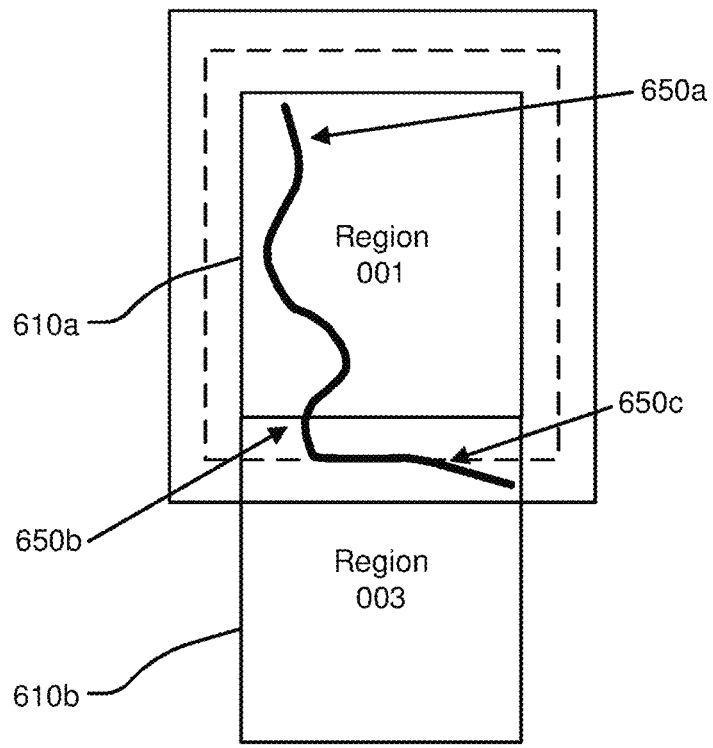

FIGS. 6A-6B illustrate example geographical regions 610*a* and 610*b* that may be defined in an HD map according to one or more embodiments. FIG. 6A illustrates a square geographical region 610*a*. FIG. 6B illustrates two neighboring geographical regions 610*a* and 610*b*. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610*a* and a boundary 630 for a buffer of approximately 100 m around the geographic region 610*a*.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650*a* in the geographical region 610*a*. The corresponding vehicle 150 may traverse along a route to reach a location 650*b* where it may cross the boundary of the geographical region 610 but may stay within the boundary 620 of the buffer. Accordingly, the vehicle computing system 120 of the corresponding vehicle 150 may continue to use the geographical region 610*a* as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
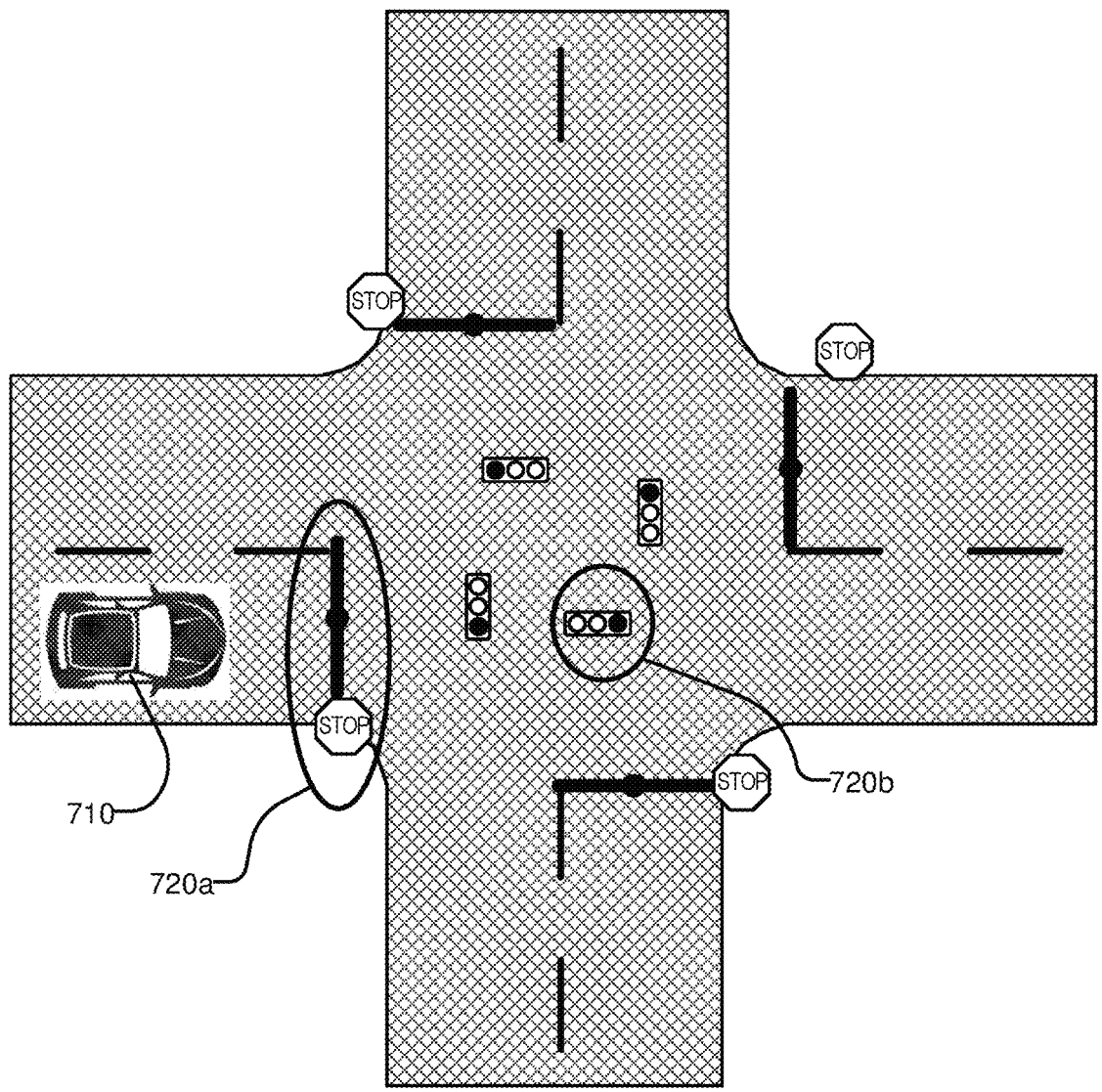
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
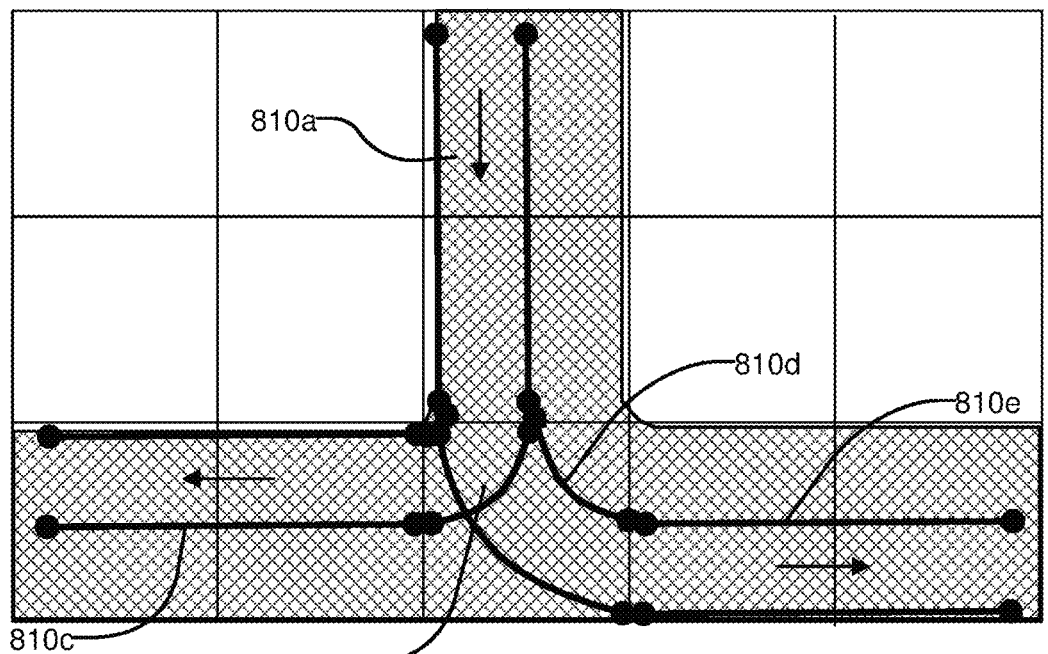
FIGS. 8A-8B illustrates example lane elements and relationships between lane elements in an HD map.
Figure 8B:
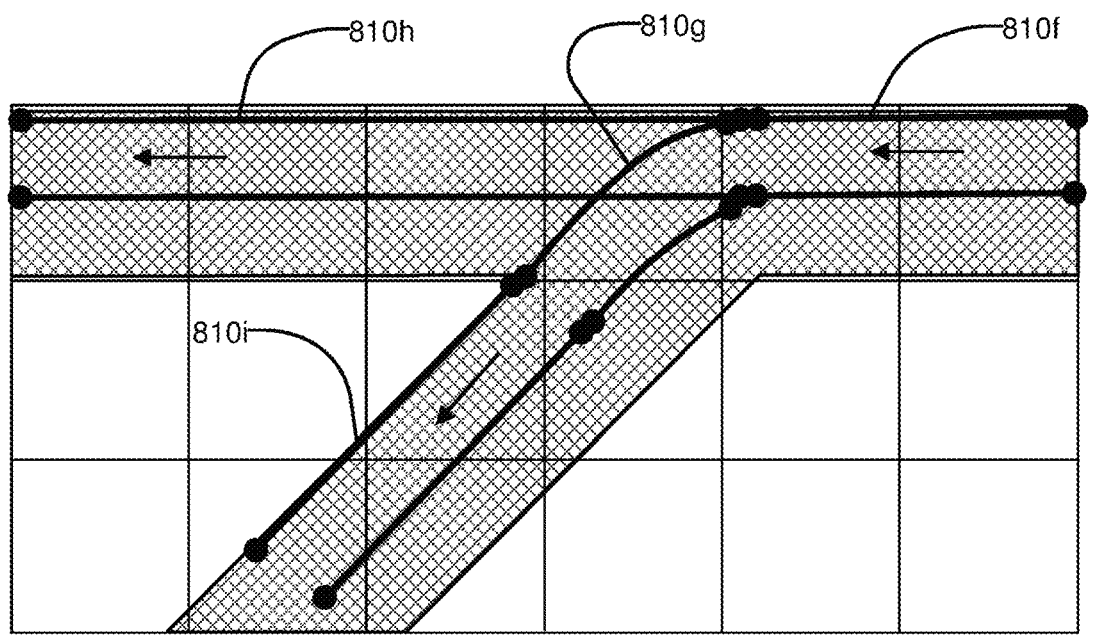

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810*i* via lane 810*g*. The HD map system 100 may determine a route from a source location to a destination location as a sequence of connected lane elements that can be traversed to reach from the source location to the destination location.

Localization

Figure 9:
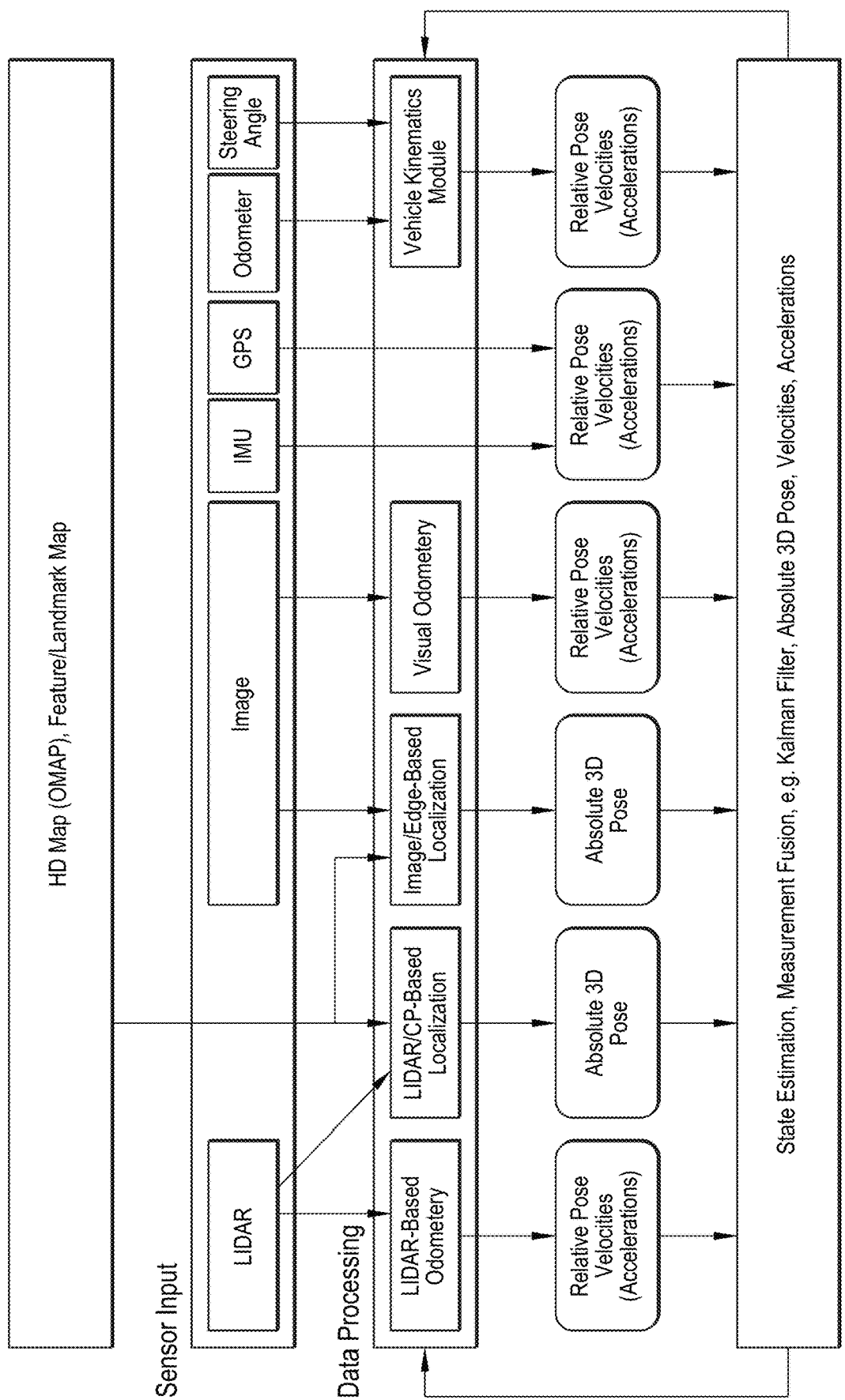
FIG. 9 illustrates an example system architecture of a localizer of a localization module of a vehicle computing system.

FIG. 9 illustrates an example system architecture of a localizer 292 of the localization module 290 of the vehicle computing system 120 of FIG. 2. In some embodiments, the localization module 290 may estimate the dynamic state of a moving vehicle using sensor data as acquired by the vehicle. The dynamic state may include a 6D global/world pose in terms of latitude, longitude, altitude, and 3D heading (North-East-Up). Localization may also determine translational/linear and rotational velocities and translational/linear accelerations of the vehicle. The input data may come directly from the vehicle's sensors, from files on disk (storage), or possibly from servers in the cloud. This data may be provided to the localization module 290 in a time-sequential order. However, some data may require processing (e.g., LIDAR and camera-images), the results of which may be used for vehicle localization. Such derived vehicle-state measurements may arrive out of sequence. In other words, even though the input data is acquired and possibly passed to the localization module 290 in time-sequential order, the actual sequence in which those measurements are used for localization may not be time sequential. Therefore, a current estimate of a vehicle's dynamic state can be obtained through a localization API.

In some embodiments, the localization module 290 may support two operation modes: real-time mode and replay mode. The real-time mode may process the data as it comes in, such as asynchronously or in parallel. The actual sequence of estimate requests and state updates may be arbitrary. Thus, the results may differ between runs. The replay mode may process the data according to a previously recorded (or otherwise established) localization event sequence. Processing may be synchronous, and the results may be deterministic, such that the order may be controlled by means of the localization event sequence. The real-time mode may be applied to the operation of the localization module 290 on a vehicle, with the data being generally streamed directly from the vehicle's sensors. The real-time mode may also be used in conjunction with previously recorded data. The data may be processed asynchronously and subject to real-time constraints, and the current vehicle state estimate may be requested at any time. Consequently, the order in which the data is processed and used for localization, along with the intermittent requests of current estimates, may not be controlled.

In some embodiments, the localization module 290 may perform two atomic operations that determine the localization results: requesting an estimate of the current vehicle state, and updating the estimate through direct or derived measurements of the vehicle's state. In some embodiments, real-time constraints may also affect the localization behavior (e.g. an algorithm may have to finish before reaching convergence due to time constraints). In real-time mode, the sequence of estimation requests and update operations may be recorded as a localizer event sequence along with event identifiers describing why the operations were issued and what timing-dependent parameters were used in a particular algorithm. The event identifiers may relate to particular measurements and sensors (e.g. a LIDAR-scan from a specific time and sensor, or an API request of the current vehicle state estimate). The replay mode may allow localization behavior to be deterministically reproduced (re-played) given a stream of recorded data and a localizer event sequence. For truly deterministic localization replay, the current vehicle state estimate may not be requested asynchronously, but instead it may be received through a designated callback by means of a localization API.

Internally, the localization module 290 may deploy various algorithms to estimate a vehicle's dynamic state. For example, LIDAR data and image data may be used to estimate an absolute pose with respect to an HD map as well as the velocities/accelerations and relative pose with respect to previous measurements (e.g., odometry). In some embodiments, derived and direct measurements may be fused together by means of state estimation algorithms (e.g. Kalman filters) in order to obtain robust and optimal state estimates. Direct state measurements may come, for example, from inertial measurement units (IMU).

In some embodiments, the localization module 290 may include the localizer 292, the vehicle state filter manager 294, and the vehicle state filter 296, as disclosed in FIG. 2. In some embodiments, the localizer 292 may receive/buffer sensor data, handle certain data conversion aspects, guarantee atomic state requests/updates, invoke data processing algorithms, and provide state measurements to the vehicle state filter manager. The localizer 292 may function in a real-time mode or in a replay mode. In the real-time mode, the localizer 292 may provide asynchronous processing with real-time constraints, and may log the sequence of location events. In the replay mode, the localizer 292 may perform all processing according to a given localization event sequence, and may perform synchronous processing with optionally delayed insertion of results into the vehicle state filter 296. The localizer 292 may also send state measurements (e.g., world coordinates) to the vehicle state filter manager 294, as well as receive state estimates (e.g., world coordinates) from the vehicle state filter manager 294. In some embodiments, the vehicle state filter manager 294 may convert between world and local coordinates, switch between local sectors, buffer state measurements for a time window to deal with out of sequence measurements, associate measurements with prediction uncertainties, invoke measurement fusion/state estimation (e.g., synchronously process the buffered measurements upon request for a single filter or asynchronously process the buffered measurements upon measurement arrival for multiple filters). In some embodiments, the vehicle state filter 296 may include, for example, a square root unscented Kalman filter, or some other filter.

In some embodiments, the localizer 292, vehicle state filter manager 294, and vehicle state filter 296 of the localization module 290 may form a nested structure. The localizer 292 may be the outermost component, and may handle raw sensor data. The data may be buffered and processed to generate estimates regarding the vehicle's dynamic state, (e.g., 3D pose, velocities, and accelerations). The resulting state measurement may then be passed to the vehicle state filter manager 294, which may constitute a second layer, and may manage the measurement buffering, filtering, and local-sector switching. The vehicle state filter 296 may consume time sequential state measurements as provided by the vehicle state filter manager 294. The vehicle state filter 296 may estimate an optimal vehicle state given the measurements and their uncertainties (e.g., standard deviations) as well as the uncertainties (e.g., standard deviations) of the model-based predictions. Subsequently, the estimated vehicle state for a given timestamp may be obtained. If the timestamp is in the future (i.e. past the last measurement), the vehicle state filter 296 may effectively predict the state using the current state and the prediction model.

As mentioned above, the localizer 292 may receive different sensor inputs (e.g. LIDAR, images, IMU etc.) as disclosed in FIG. 9. The different sensor modalities may be processed by designated algorithms to generate estimates of the vehicle's dynamic state. Localization algorithms may find the absolute 3D pose with respect to a known map. Odometry algorithms may compute the relative 3D pose or velocities/accelerations from consecutive measurements. In addition, since most algorithms employ an initial guess of the vehicle state, this initial guess may be provided by the vehicle state filter 296.

Iterative-Closest-Point (ICP) Technique

Some embodiments may employ an ICP technique for performing localization. An ICP technique may be generally employed to minimize the difference between two point clouds. In some embodiments of the ICP technique, one point cloud (e.g., vertex cloud), called the target or reference point cloud, may be kept fixed, while the other point cloud, call the source point cloud, may be transformed to best match the reference point cloud. The ICP technique may iteratively revise the transformation (e.g., combination of translation and rotation) needed to minimize an error metric, usually a distance from the source point cloud to the reference point cloud, such as the sum of squared differences between the coordinates of the matched pairs. The ICP technique may align 3D models (e.g., point clouds) given an initial guess of the transformation required.

In some embodiments, a system receives as input a reference point cloud and a source point cloud, an initial estimation of the transformation to align the source point cloud to the reference point cloud, and some criteria for stopping the iterations. For example, the reference point cloud may be the point cloud of an HD Map (OMap) and the source point cloud may be a LIDAR scan. The system may perform the ICP technique to generate a refined transformation, for example, the transformation to determine the pose of the vehicle (or the LIDAR) given the OMap of the region. For example, for each point in the source point cloud, the system may match the closest point in the reference point cloud (or a selected set). The system may then estimate the combination of rotation and translation which will best align each source point to its match found in the previous step. In some embodiments, the system may use a root mean square point to point distance metric minimization technique for estimating the combination of rotation and translation. The system may next weigh points and reject outliers prior to alignment. The system may then transform the source points using the obtained transformation. The system may next repeat these actions (e.g., by re-associating the points, and so on) until a predetermined stopping criteria is met.

Deep Learning Model

Figure 10:
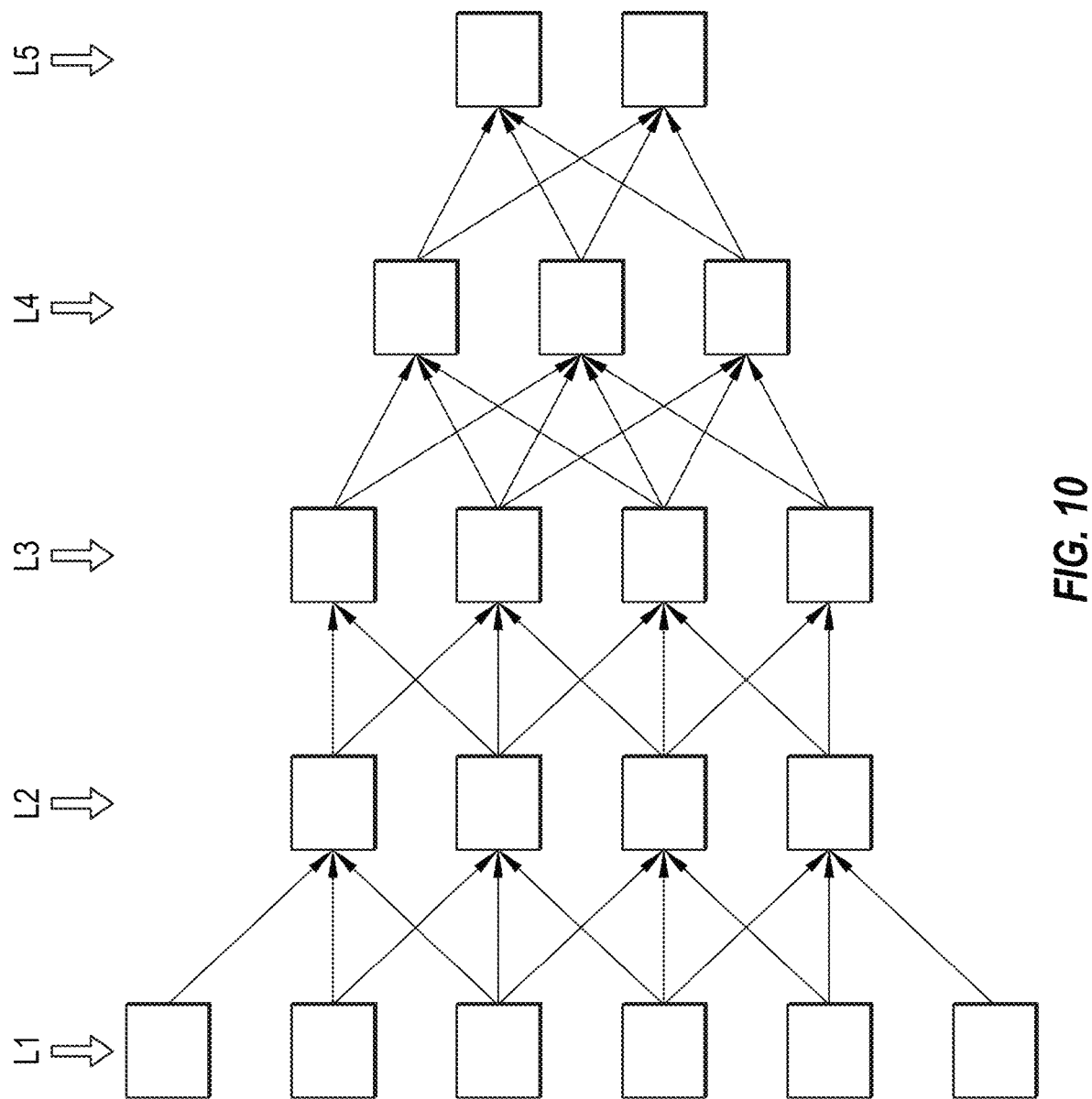
FIG. 10 illustrates an example neural network that may be used to generate a semantic vector for a received content item.

FIG. 10 illustrates an example neural network that may be used to generate a semantic vector for a received content item, in accordance with some embodiments. The neural network NN comprises a plurality of layers (e.g., layers L1 through L5), each of the layers comprising one or more nodes. Each node has an input and an output, and is associated with a set of instructions corresponding to the computation performed by the node. The set of instructions corresponding to the nodes of the neural network may be executed by one or more computer processors. The neural network NN may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

The first layer of the neural network NN (e.g., layer L1) may be referred to as the input layer, while the last layer (e.g., layer L5) is referred to the output layer. The remaining layers between the input and output layers (e.g., layers L2, L3, L4) are hidden layers. Accordingly nodes of the input layer are input nodes, nodes of the output layer are output nodes, and nodes of the hidden layers are hidden nodes. Nodes of a layer may provide input to another layer and may receive input from another layer. For example, nodes of each hidden layer are associated with two layers (a previous layer and a next layer). The hidden layer receives the output of the previous layer as input and provides the output generated by the hidden layer as input to the next layer. For example, nodes of hidden layer L3 receive input from the previous layer L2 and provide input to the next layer L4.

The neural network NN is configured to determine semantic features of received content items, such as camera images or LIDAR point clouds. The layers of the neural network NN are configured to identify features within the received content item. In some embodiments, early layers of the neural network NN (e.g., layers closer to the input layer) may be convolutional layers configured to perform low level image processing such as edge detection, etc. Later layers of the neural network NN (e.g., layers closer to the output layer) may be configured to perform higher level processing such as object recognition, etc. In some embodiments, the layers of the neural network NN perform recognition of objects in different scales using max pooling between scales, recognitions of objects in different orientations using Gabor filtering, recognition of objects with variances in location using max pooling between neighboring pixels, and/or the like.

In some embodiments, the network characteristics of the neural network (e.g., weights between nodes) may be updated using machine learning techniques. For example, the neural network NN may be provided with a training set comprising known input content items. The determined semantic features of the content items may be compared to the actual expected semantic features associated with each of the content items, whereupon the comparison is used to update the network characteristics of the neural network. In some embodiments, the network characteristics of the neural network are learned by optimizing a loss function using backpropagation.

In some embodiments, the neural network NN may be configured to categorize objects and/or regions of content items, such as camera images or LIDAR point clouds as belonging to a given class of object. An example of such classes of objects may include objects in an urban environment, such as sky, buildings, roads, sidewalks, fences, poles, traffic signs, vegetation, tree trunks, terrain, bicycles, vehicles, pedestrians, windows, etc. In some embodiments, edges may be detected for a region of a camera image and the region may undergo object detection and classification into one of the sets of known classes, or an unknown class. In these and other embodiments, the various classes for the various regions, pixels, etc. of the content items may be represented as a semantic vector of content item.

HD Map Segmentation

Figure 11A:
FIG. 11A illustrates an example camera image to be used in annotating high definition (HD) map data with semantic labels.
Figure 11B:
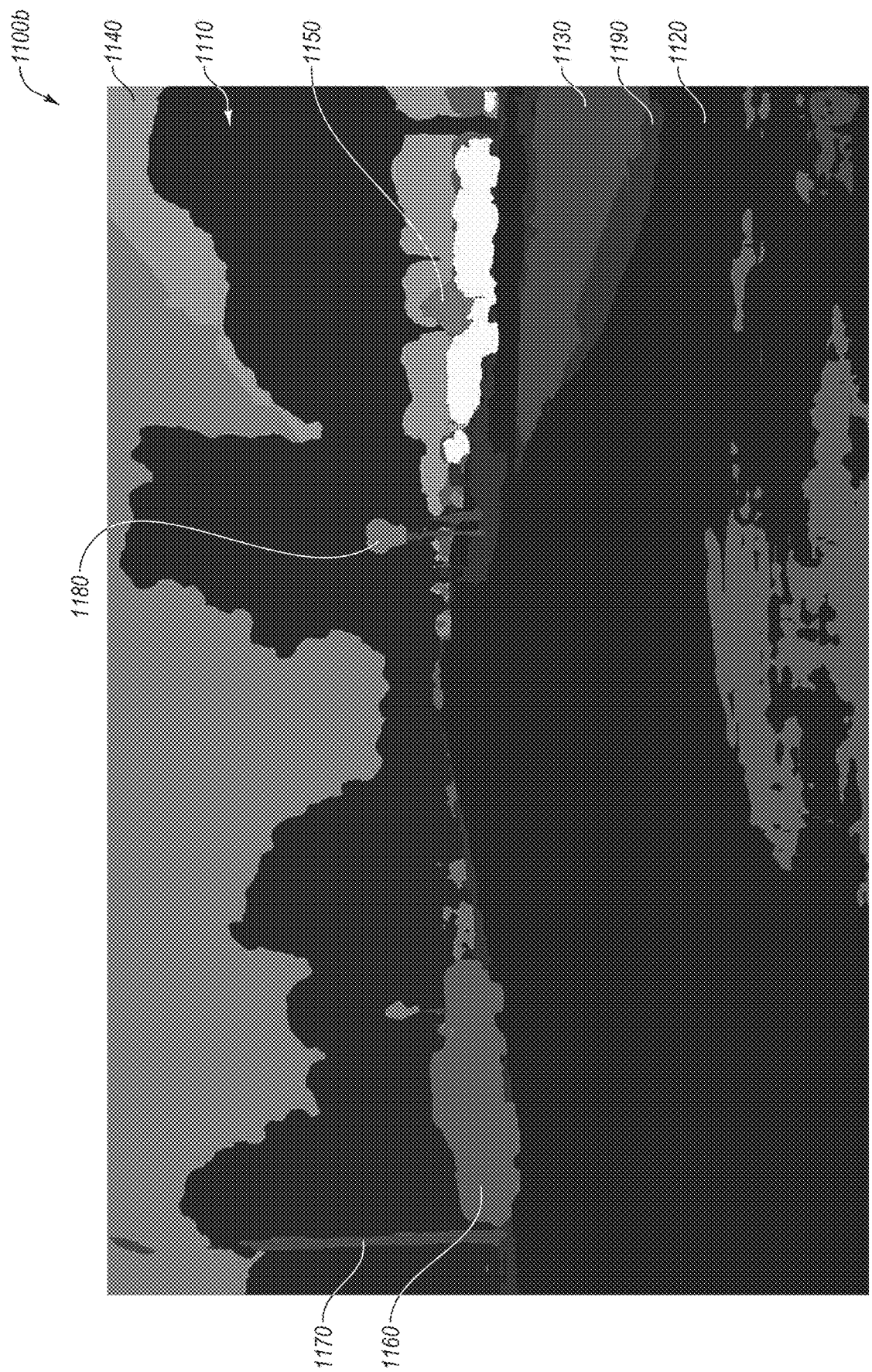
FIG. 11B illustrates an example of the camera image of FIG. 11A after being segmented into classes of objects in the camera image.
Figure 12:
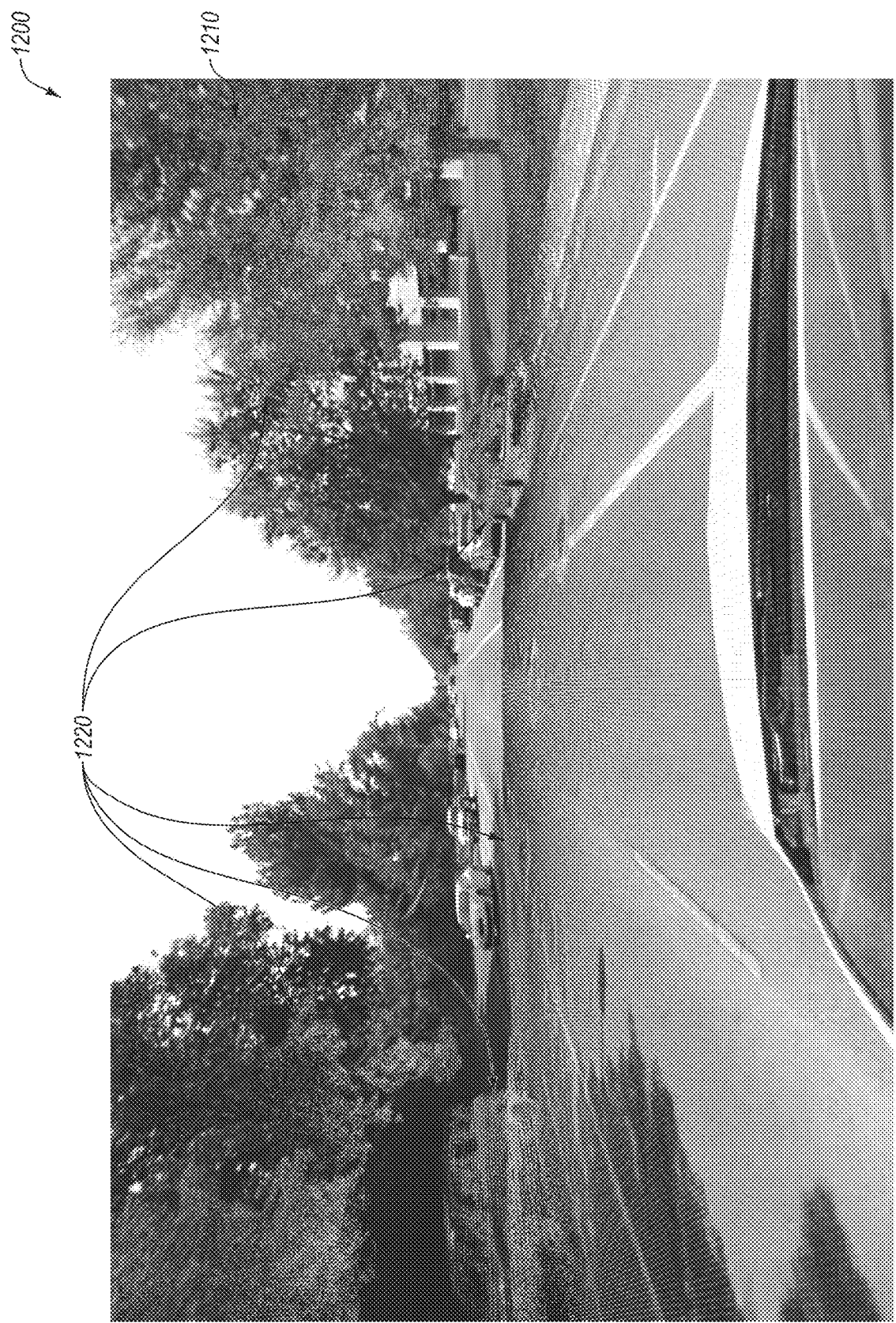
FIG. 12 illustrates an example of mapping 3D points from a map onto an example camera image.
Figure 13:
FIG. 13 illustrates an example of an HD map that has been annotated with semantic labels.

When performing HD map segmentation, a process may be followed in which camera images and/or LIDAR cloud points may be segmented into classes of objects within the camera images and/or LIDAR cloud points. An example of a camera image and a segmentation of that camera image are illustrated in FIGS. 11A and 11B respectively. 3D points of the HD map may be mapped onto the camera image. An example of mapping the 3D points of the HD map onto a camera image are illustrated in FIG. 12. Each of the 3D points within the camera image and/or LIDAR cloud points may then be associated with the class of object as determined in the segmentation of the camera images and/or LIDAR cloud points as a semantic label, and that process may be repeated over a number of camera images to project the class of objects onto a number of the 3D points of the HD map. A combination may be performed across multiple images that cover the same 3D point to find the appropriate semantic label for the 3D point. An example of a portion of a semantically labeled HD map (e.g., an HD map in which the objects within the map are segmented to include a corresponding classification) is illustrated in FIG. 13.

In some embodiments, the learning model may be applied directly to LIDAR points rather than or in addition to camera images. In these and other embodiments, with a sufficiently large training data set, the learning model may classify the LIDAR points directly. By classifying the LIDAR points, the mapping and classifying of camera images may be avoided, and the semantic labels of the LIDAR points as determined by the learning model may be projected directly onto the corresponding three dimensional points of the HD map. Additionally or alternatively, by classifying LIDAR points, the coverage and density of coverage for semantic labeling may be improved. For example, a camera image may cover approximately one hundred degrees of a forward-facing view while a LIDAR point cloud may cover a full three hundred and sixty degrees. In some embodiments, for LIDAR point clouds to be used for object classification, the LIDAR sensor may utilize a threshold LIDAR point density. For example, the density may be sufficient to identify a car. Examples of such density may include approximately one degree between scan lines, at least sixteen scanning lines, at least thirty-two scanning lines, etc. In some embodiments, the threshold density may be based on a target distance at which an object is to be resolved (e.g., is the object to be accurately classified at a distance of three meters or thirty meters).

In some embodiments, learning models may be applied to both camera images and LIDAR points. In these and other embodiments, a combination of both classifications may or may not be used. For example, if the learning models for both the camera images and LIDAR points identify the same class for a given three dimensional point, a certain confidence of accuracy may be achieved while if there is an inconsistency between the two models, a conflict resolution may take place. For example, one model may be favored over the other in general (e.g., the camera image classification where that data is available and otherwise using the LIDAR classification), one model may be favored over the other depending on the object (e.g., the model for the camera images may be more accurate for trees and people while the model for the LIDAR points may be more accurate for road), one object may be favored over the other based on relative confidence scores (e.g., the confidence scores of the two models may be correlated in some manner such that a relative confidence score between the two models may be determined), or any other conflict resolution.

In some embodiments, for each set of LIDAR point cloud and corresponding camera image, the LIDAR point cloud may be projected onto the camera image with the corresponding information from the camera image as obtained by segmentation (e.g., color, semantic label/class of object, whether it is an edge, etc.). The LIDAR points may then be mapped to the 3D points of the map. Such an embodiment may have reduced coverage due to the difference in coverage between camera images and LIDAR point clouds.

FIG. 11A illustrates an example camera image 1100a to be used in annotating high definition (HD) map data with semantic labels, in accordance with one or more embodiments of the present disclosure. For example, the camera image 1100a may be captured during a process of generating HD maps, OMaps, or other maps to be used in localization or other processes for facilitating navigation or other operation of an autonomous vehicle. In these and other embodiments, the camera image 1100a may be captured while traversing a track within a local region of the HD map being generated. The camera image 1100a may be captured in conjunction with a set of LIDAR points (e.g., a LIDAR point cloud). For example, the camera image 1100a may be captured at the same time as a LIDAR point cloud such that the camera image 1100a and the LIDAR point cloud may be used in conjunction with each other.

In some embodiments, the camera images and associated LIDAR points may be captured repeatedly, or may be periodically captured as the track within the local region of the HD map is traversed.

FIG. 11B illustrates an example of the camera image 1100a of FIG. 11A after being segmented into classes of objects with corresponding semantic labels in a segmented camera image 1100b, in accordance with one or more embodiments of the present disclosure.

In some embodiments, a captured camera image, such as the camera image 1100a of FIG. 11A may be provided to a neural network (such as the neural network described with reference to FIG. 10) to facilitate segmentation of the camera image. In segmentation, the neural network may classify each object within the image within a certain class of objects. For example, as illustrated in FIG. 11B, for the segmented camera image 1100b, the edges of various objects have been identified and the objects have been classified, such as the region 1110 being classified as vegetation, the region 1120 classified as road, the region 1130 classified as terrain, the region 1140 classified as sky, the region 1150 classified as a bicycle, the region 1160 classified as a car, the region 1170 classified as a pole, the region 1180 classified as a traffic sign, and the region 1190 classified as sidewalk. In these and other embodiments, each classification may correspond to a respective semantic label.

As can be seen by comparing the camera image 1100a in FIG. 11A with the segmented camera image in FIG. 11B, the edges of objects of the same class may be merged into a solid region associated with a given semantic label. For example, rather than individual trees, the entire region 1110 is associated with the semantic label of vegetation.

In some embodiments, rather than performing segmentation on each collected camera image, a subset of the camera images may be segmented. For example, the segmentation may be performed on a given camera image collected approximately between every five meters and every twenty meters. By limiting the number of camera images upon which segmentation is performed to a threshold distance, the computation cost may be reduced. Additionally or alternatively, by selecting periodic camera images, certain artifacts of the camera image may be avoided. For example, if the camera sensor is mounted to a vehicle traversing the local section of the map, using camera images every threshold distance (e.g., five meters) may avoid the hood of the vehicle appearing in the segmented and/or annotated map. For example, if four or five images cover the given 3D point that includes the hood of the vehicle in one of the images, the 3D point will be associated with the correct semantic label after the combination as the four images without the hood may override the single image that does contain the hood.

FIG. 12 illustrates an example of mapping 3D points 1220 from a map onto an example camera image 1210, in accordance with one or more embodiments of the present disclosure. As illustrated in FIG. 12, an HD map may include one or more 3D points 1220 that may be associated with a local region of the HD map. For example, for each of the 3D points 1220 in the HD map, the 3D points 1220 may be mapped onto a given camera image. In some embodiments, a corresponding LIDAR point cloud may additionally be used to facilitate mapping the 3D points 1220 onto the camera image 1210.

In some embodiments, the 3D points 1220 and/or the LIDAR point cloud may extend beyond a given camera image (e.g., the 3D points 1220 may extend beyond the field of view of the given camera image). In these and other embodiments, the 3D points 1220 beyond the given camera image may be ignored or dropped from projecting the 3D points 1220 onto the given camera image.

In some embodiments, certain aspects of the camera image may be masked or otherwise removed before the projection is performed. For example, the hood of the vehicle capturing the camera image may be masked or otherwise avoided when projecting the 3D points 1220 onto the image. For example, as illustrated in FIG. 12, the 3D points 1220 do not map and conform to the hood of the vehicle capturing the image. Instead, the 3D points follow the plane of the road upon which the vehicle is travelling.

After projecting the 3D points 1220 onto the camera image 1210, the corresponding semantic labels for the associated pixel(s) in the camera image 1210 (e.g., the class to which the object occupying the pixel(s) belongs) may be mapped to the 3D points 1220. For example, a given 3D point may overlap with four pixels, all of which belong to the class of "road," and the 3D point may be assigned the semantic label of road.

In some embodiments, multiple images may cover the same 3D point. In these and other embodiments, some combination may occur for the different semantic labels for that 3D point. For example, the most frequent semantic label may be used, or a weighted average may be used, etc. In these and other embodiments, semantic labels associated with dynamic objects (e.g., people, cars, bicycles, etc.) may be removed prior to the combination.

FIG. 13 illustrates an example of an HD map 1300 that has been annotated with semantic labels, in accordance with one or more embodiments of the present disclosure. For example, as illustrated in FIG. 13, the various regions within the map 1300 may correspond to various classes of objects. For example, the objects may include buildings 1305, vegetation 1310, fences 1315, road 1320, terrain 1330, bicycles 1350, cars 1360, poles 1370, traffic signs 1380, sidewalk 1390, and/or unprojected regions 1395 of the map (e.g., regions that fall outside of the camera images such that the LIDAR points/three dimensional points of the HD map do not include a semantic label).

In some embodiments, dynamic objects may be removed from the HD map 1300. For example, pedestrians, cars, bicycles, etc. may be removed from the HD map 1300. In some embodiments, the dynamic objects may be removed prior to combining multiple potential semantic labels to arrive at a single semantic label for a given 3D point.

In some embodiments, ray tracing may be performed when initially generating the three dimensional points in the HD map such that dynamic objects may be prevented from generating three dimensional points in the HD map. In these and other embodiments, any LIDAR points that do not have a corresponding three dimensional point in the HD map (e.g., because of the LIDAR point landing on a moving person, car, etc.) may be discarded such that the HD map may include semantic labels for the static three dimensional points generated in the initial HD map generation.

In some embodiments, when seeking to generate the HD map 1300, a set of camera images and/or LIDAR point clouds may be available for selection. One camera image/LIDAR point cloud may be selected every threshold distance, such as every five meters. Each of the selected camera images may be provided to the segmentation process (e.g., a neural network like that illustrated in FIG. 10) to create semantic labels for different regions in the camera images based on the classes of objects to which the regions belong. The 3D points of the HD map 1300 may be mapped onto the camera images, and the corresponding semantic labels may be projected onto the 3D points of the HD map 1300.

Figure 14:
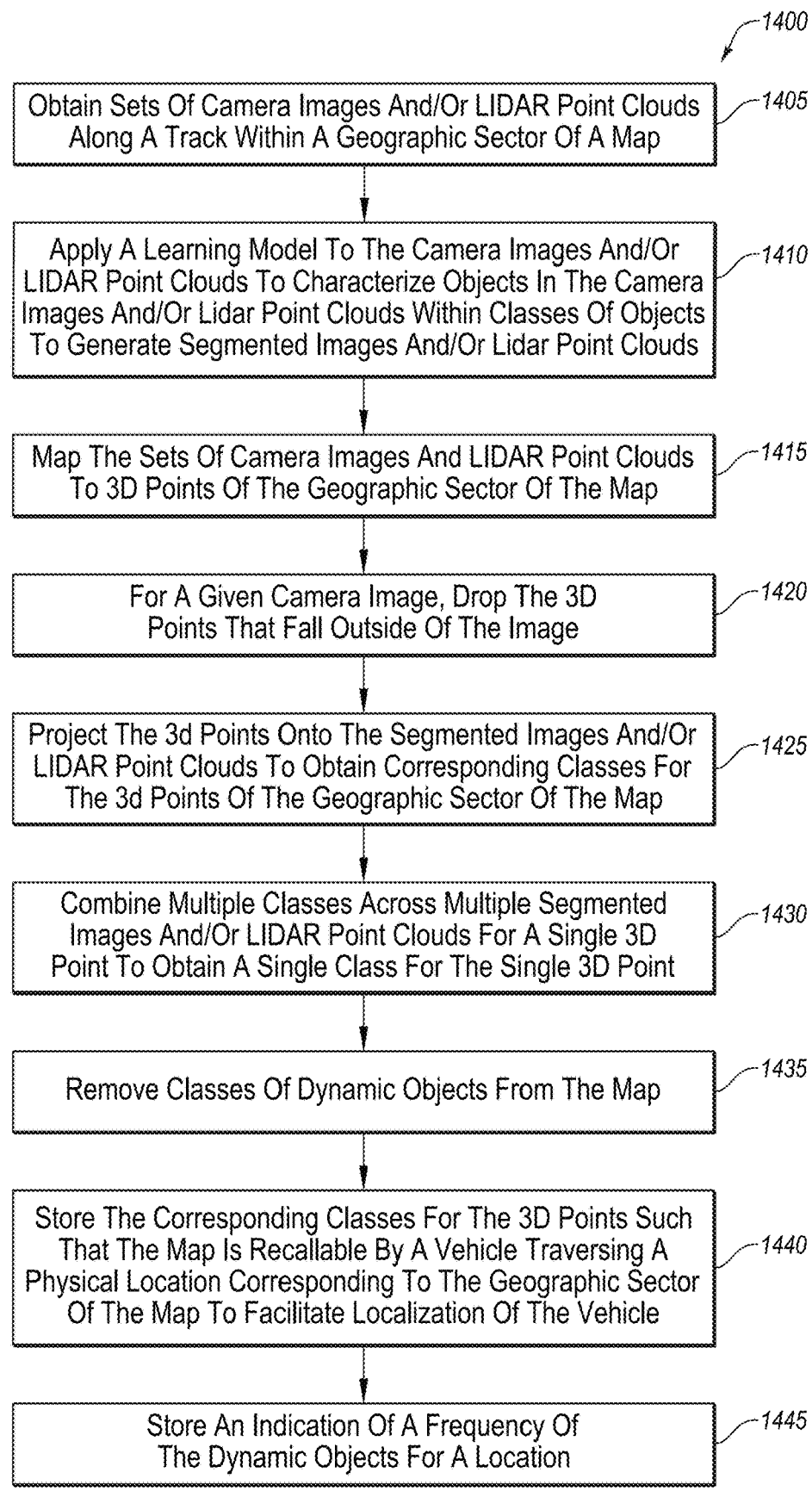
FIG. 14 illustrates a flowchart of an example method of annotating high definition (HD) map data with semantic labels.

FIG. 14 illustrates a flowchart of an example method 1400 of annotating high definition (HD) map data with semantic labels. The method 1400 may be performed by any suitable system, apparatus, or device. For example, one or more elements of the HD map system 100 of FIG. 1 may be configured to perform one or more of the operations of the method 1400. Although illustrated with discrete blocks, the actions and operations associated with one or more of the blocks of the method 1400 may be divided into additional blocks, combined into fewer blocks, or eliminated, depending on the particular implementation.

At block 1405, sets of camera images and/or LIDAR point clouds along a track within a geographic sector of a map may be obtained. For example, when generating HD maps for a geographic region corresponding to the geographic sector of the map, a vehicle may traverse the track while capturing camera images and/or LIDAR point clouds. In some embodiments, such capturing may occur repeatedly/continuously, or may occur based on time/distance elapsed. In some embodiments, the operation 1405 may include a selection of certain camera images and/or LIDAR point clouds captured along the track.

In some embodiments, the HD map may be generated with corresponding 3D points (for example, based on the LIDAR point clouds) and a set of camera images may be obtained for each of the 3D points, or as many of the 3D points that include a corresponding camera image. In some embodiments, such a set may include a maximum and/or a minimum number of images for each of the corresponding 3D points.

At block 1410, a learning model is applied to the camera images and/or LIDAR points to characterize objects in the camera images and/or LIDAR points within one or more classes to generate segmented images and/or LIDAR point clouds. For example, the camera images from the block 1405 may be provided to a deep neural network (such as the neural network illustrated in FIG. 10) to classify each of the objects in the camera images. Such classes of objects may include dynamic objects (such as people, bicycles, cars, animals, vehicles, etc.) and static objects (such as buildings, trees, poles, street signs, etc.). In some embodiments, certain classes of objects may be available for the learning model to select from based on being in an urban or a rural area. In some embodiments, each pixel in the camera image may be provided with a semantic label corresponding to the class of object identified by the learning model. When applying the learning model to camera images, the method 1400 may proceed to the block 1415.

In some embodiments, the learning model may be applied to the LIDAR points to classify the LIDAR points into classes of objects to directly provide the LIDAR points with semantic labels. When applying the learning model to LIDAR points, the method 1400 may proceed directly to the block 1425.

In some embodiments, learning models may be applied to both camera images and LIDAR points. In these and other embodiments, a combination of both classifications may or may not be used. When both types of sensor data are classified, the method 1400 may proceed to the block 1415 for processing of the camera image semantic labels and may apply the block 1425 to both the semantic labels of the camera images and the LIDAR points.

At block 1415, the sets of camera images and/or LIDAR point clouds may be mapped to 3D points of the geographic sector of the map. An example, of an output camera image to 3D point mapping may be illustrated in FIG. 12. In some embodiments, the LIDAR point clouds may be utilized to facilitate the creation of the 3D points in the geographic sector of the map and/or to facilitate the mapping of the 3D points of the geographic sector of the map onto the camera image.

At block 1420, for a given camera image, the 3D points that fall outside of the given image may be dropped or ignored. For example, a set of the given camera image and a corresponding LIDAR point cloud may have different scopes of coverage. The camera image may have a more narrow field of view/coverage as compared to the LIDAR point cloud. In embodiments in which the LIDAR point cloud is used to map to the 3D points, there may be 3D points outside of the camera image. Such points may be dropped or ignored for further processing and/or analysis.

At block 1425, the 3D points may be projected onto the segmented camera images and/or the classified LIDAR points to obtain corresponding classes for the 3D points of the geographic sector of the map. For example, for a given camera image, the 3D points as mapped in the block 1415 may be given a semantic label corresponding to that given to the pixels that map to the 3D point. As another example, the classification of LIDAR points at the block 1415 may be projected onto the corresponding 3D points of the map. As a further example, if both camera images and LIDAR points have been classified, the block 1425 may include conflict resolution for any inconsistencies between the two classifications In some embodiments, a confidence score may also be applied to the 3D point in conjunction with the semantic label. The confidence score may be based on any of a variety of factors such as which learning model was used to classify the object (e.g., certain learning models may be more accurate for certain objects), which sensor data was utilized to classify the object (e.g., camera learning models may be more accurate than LIDAR point learning models), whether multiple learning models agreed (e.g., a classification agreed on by both camera image and LIDAR point learning models may have a higher confidence score), etc. In some embodiments, certain factors in determining the confidence score may be weighted more heavily than others.

At block 1430, multiple classes across multiple segmented images and/or LIDAR point classifications may be combined to obtain a single class for a single 3D point. For example, after processing all of the camera images obtained at the block 1405, the single 3D point may include multiple semantic labels based on multiple camera images covering the single 3D point. For example, the most frequent semantic label may be assigned to the 3D point, or a weighted average may be applied. In some embodiments, dynamic semantic labels (e.g., labels indicating a person or bicycle) may be removed before such an average or frequency check is determined. As another example, if multiple LIDAR point clouds have different classifications for the same 3D point, a similar combination may occur. In some embodiments, the combination may be based on a relative age of one or more of the data points, such as how close together the LIDAR point and/or the camera images are to each other such that data that is further apart in time may be less likely to be consistent than data that is close in time.

At block 1435, classes of dynamic objects may be removed from the map. For example, for 3D points that are classified as pedestrians, vehicles, bicycles, etc. may be removed from the map. In some embodiments, the 3D point may be back-filled with the same semantic label as the surrounding 3D points. Additionally or alternatively, other potential classes of objects (such as the less-frequent classes as determined in the block 1430) may be utilized to classify the 3D point.

In some embodiments, the dynamic objects are removed to facilitate localization when a vehicle utilizes the map. For example, the dynamic objects may change location or simply not be present when an autonomous vehicle is in the same place at some future time and using the map. If the dynamic objects is left in the map, any localization may be compromised and/or cause errors because the objects to help facilitate localization is not present or has moved as compared to sensor data being collected by the autonomous vehicle at the future time.

In some embodiments, certain processing or data may be captured before removing the dynamic objects from the map. For example, the dynamic objects may be added to the map but in a different layer that is not used for localization, but may be used for other purposes. For example, for a location with a high density of pedestrians, the autonomous vehicle may decrease its speed to facilitate caution around the large number of people.

At block 1440, the corresponding classes/semantic labels for the 3D points may be stored such that the map is recallable by a vehicle traversing a physical location corresponding to the geographic sector of the map to facilitate localization of the vehicle. For example, the map may store the semantic labels as a value associated with the 3D points. Such labels may facilitate localization of the vehicle traversing the physical location in the future as real-time sensor data may be compared to the map. If the real-time sensor data includes the same arrangement of classes of objects, the autonomous vehicle may know its location within the map due to the overlap of the corresponding classes, etc. between the real-time sensor data and the semantic labels of the map.

At block 1445, an indication of a frequency of the dynamic objects for a location may be stored. For example, a heatmap of the frequency of different classes of dynamic objects may be stored for each physical location (e.g., latitude and longitude) in the map. In some embodiments, the heatmap may include a two-dimensional representation of changing visual tones depending on the frequency of certain classes of dynamic objects proximate the physical location.

In some embodiments, a similar or comparable process may be followed to facilitate the attaching of colors and/or edges to the map. For example, colors within the camera image may be identified, the 3D points of the map may be mapped to the camera images, and a corresponding color may be applied to the 3D point. In these and other embodiments, each 3D point of the map may include a corresponding vector of information, such as semantic label (e.g., class of object), color, whether the 3D point is at an edge of the object, etc. In these and other embodiments, the classes of the objects may be conceptualized as the potential colors and edges of the objects.

Computer System Architecture

Figure 15:
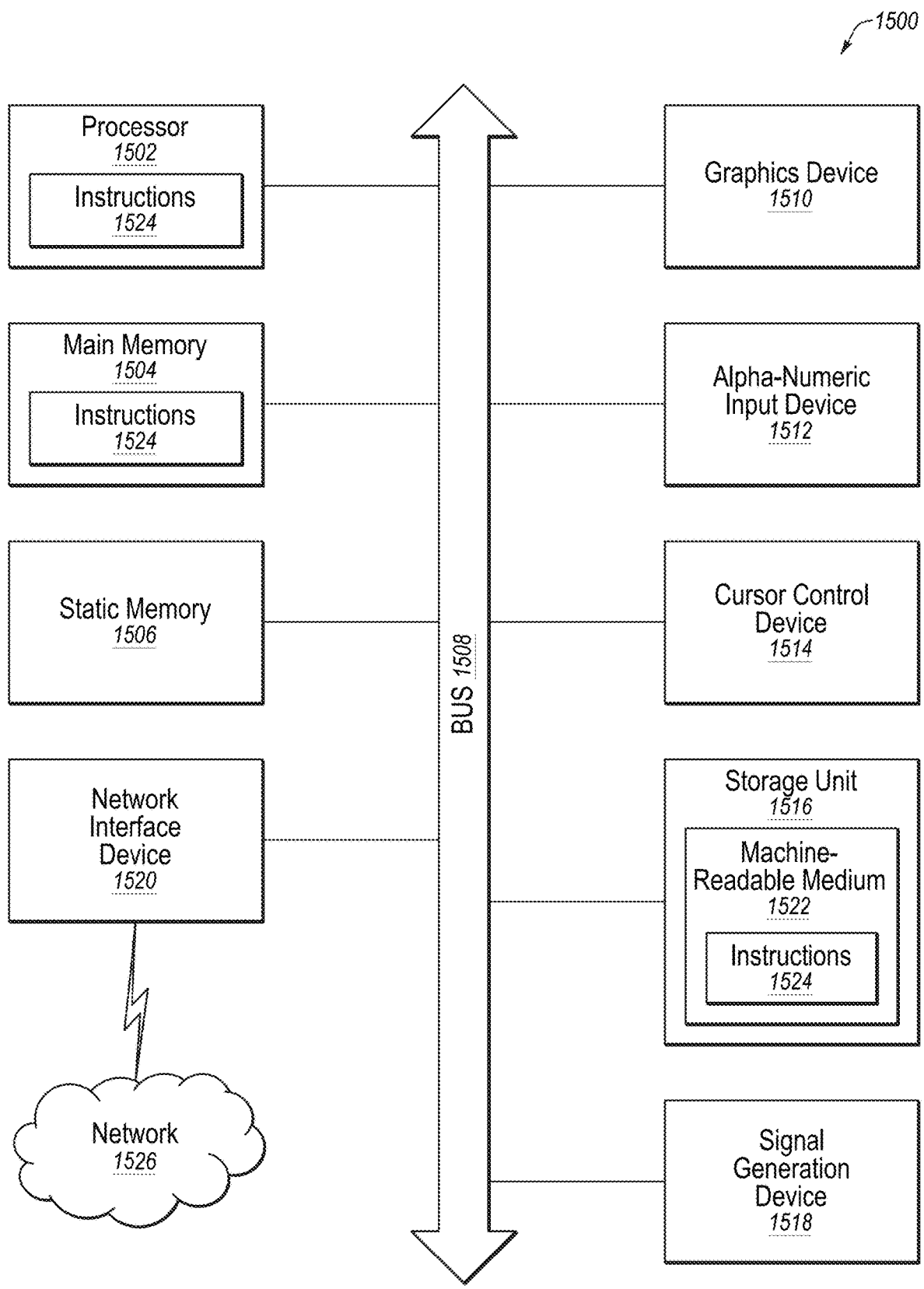
FIG. 15 illustrates an example embodiment of a computing machine that can read instructions from a machine-readable medium and execute the instructions in a processor or controller.

FIG. 15 is a block diagram illustrating components of an example computer system able to read instructions from a machine-readable medium and execute them in a processor (or controller). Specifically, FIG. 15 shows a diagrammatic representation of a machine in the example form of a computer system 1500 within which instructions 1524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 may be part of or may be any applicable system described in the present disclosure. For example, the online HD map system 110 and/or the vehicle computing systems 120 described above may comprise the computer system 1500 or one or more portions of the computer system 1500. Further, different implementations of the computer system 1500 may include more or fewer components than those described herein. For example, a particular computer system 1500 may not include one or more of the elements described herein and/or may include one or more elements that are not explicitly discussed.

The example computer system 1500 includes a processor 1502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1504, and a static memory 1506, which are configured to communicate with each other via a bus 1508. The computer system 1500 may further include graphics display unit 1510 (e.g., a plasma display panel (PDP), a liquid crystal display (LCD), a projector, or a cathode ray tube (CRT)). The computer system 1500 may also include alphanumeric input device 1512 (e.g., a keyboard), a cursor control device 1514 (e.g., a mouse, a trackball, a joystick, a motion sensor, or other pointing instrument), a storage unit 1516, a signal generation device 1518 (e.g., a speaker), and a network interface device 1520, which also are configured to communicate via the bus 1508.

The storage unit 1516 includes a machine-readable medium 1522 on which is stored instructions 1524 (e.g., software) embodying any one or more of the methodologies or functions described herein. The instructions 1524 (e.g., software) may also reside, completely or at least partially, within the main memory 1504 or within the processor 1502 (e.g., within a processor's cache memory) during execution thereof by the computer system 1500, the main memory 1504 and the processor 1502 also constituting machine-readable media. The instructions 1524 (e.g., software) may be transmitted or received over a network 1526 via the network interface device 1520.

While machine-readable medium 1522 is shown in an example embodiment to be a single medium, the term "machine-readable medium" should be taken to include a single medium or multiple media (e.g., a centralized or distributed database, or associated caches and servers) able to store instructions (e.g., instructions 1524). The term "machine-readable medium" shall also be taken to include any medium that is capable of storing instructions (e.g., instructions 1524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   causing a machine to perform one or more navigation operations based at least on a map, the one or more navigation operations including one or more of braking, steering, or accelerating and the map being updated, at least by:
      obtaining, using a first learning model, a first object classification of an object corresponding to first sensor data of a first sensor modality;
      obtaining, using a second learning model, a second object classification of the object corresponding to second sensor data of a second sensor modality, the second object classification being different than the first object classification;
      determining an object class of the object based at least on:
         the first object classification;
         the second object classification;
         a first degree of accuracy of the first learning model with respect to its ability to classify objects that are included in the first object classification; and
         a second degree of accuracy of the second learning model with respect to its ability to classify objects that are included in the second object classification; and
      updating the map based at least on the object class.

2. The method of claim 1, wherein the determining the object class is further based at least on at least one of:
- an agreement between the first object classification and the second object classification;
- a weighted average between the first object classification and the second object classification;
- a first amount of coverage of the first sensor data;
- a second amount of coverage of the second sensor data;
- a first coverage density of the first sensor data; or
- a second coverage density of the second sensor data.

3. The method of claim 1, wherein the first sensor modality includes a camera sensor and the second sensor modality includes a light detection and ranging (LiDAR) sensor.

4. The method of claim 1, wherein performance of the one or more operations based at least on the map includes performing localization of the machine based at least on the map.

5. The method of claim 1, wherein the updating of the map includes removing an encoding of the object from the map based at least on the object class corresponding to a dynamic object.

6. The method of claim 1, wherein the updating of the map is based at least on two or more iterations of the determining of the object class with respect to two or more sets of first sensor data and second sensor data respectively corresponding to different points in time.

7. The method of claim 6, wherein the updating of the map is based at least on one or more of:
- an agreement of the determining of the object class by a majority of the two or more iterations; or
- a weighted average of the determining of the object class of the two or more iterations.

8. The method of claim 1, wherein the updating of the map is based at least on an alignment of the map with respect to one or more sensor data representations corresponding to one or more of the first sensor data or the second sensor data.

9. A processor comprising one or more processing units to cause a machine to perform one or more navigation operations based at least on a map, the one or more navigation operations including one or more of braking, steering, or accelerating and the map being updated, at least by:
- obtaining a plurality of object classifications of an object as represented in a plurality of sets of sensor data, the plurality of sets of sensor data corresponding to a region, the plurality of object classifications being determined using a plurality of learning models based at least on the plurality of sets of sensor data;
- determining an object class of the object based at least on a collective analysis of the plurality of object classifications, the collective analysis being based at least on one or more of:
  - a first amount of coverage of one or more camera images of the sensor data;
  - a second amount of coverage of one or more LIDAR point clouds of the sensor data;
  - a first coverage density of the one or more camera images; or
  - a second coverage density of the one or more LIDAR point clouds; and
- classifying the object based at least on the object class.

10. The processor of claim 9, wherein individual sets of sensor data respectively correspond to different points in time and include one or more camera images and one or more light detection and ranging (LIDAR) point clouds.

11. The processor of claim 9, wherein the collective analysis of the plurality of object classifications includes one or more of:
- an identification of a most frequent same object classification among the plurality of object classifications; or
- using a weighted average of the plurality of object classifications.

12. The processor of claim 9, wherein two or more of the sets of sensor data are obtained at respective locations that are least a threshold distance apart.

13. The processor of claim 9, wherein the plurality of object classifications includes one or more of: buildings, roads, sidewalks, fences, poles, traffic signs, vegetation, terrain, bicycles, vehicles, pedestrians, colors, or edges.

14. The processor of claim 9, wherein the collective analysis is further based at least on respective degrees of confidence of the one or more learning models.

15. A system comprising:
- one or more processors to cause the system to perform operations, the operations comprising:
  - obtaining a plurality of object classifications of an object as represented in a plurality of sets of sensor data, the plurality of sets of sensor data corresponding to a region in which individual sets of sensor data respectively include first sensor data and second sensor data, the plurality of object classifications being determined using one or more learning models based at least on the plurality of sets of sensor data, respective object classifications being obtained with respect to two or more of the sets of sensor data based at least on respective locations corresponding to obtaining the two or more sets of sensor data being at least a threshold distance apart;
  - determining an object class of the object based at least on a collective analysis of the plurality of object classifications; and
  - performing, by a machine, one or more navigation operations based at least on the object class as determined for the object, the one or more navigation operations including one or more of braking, steering, or accelerating.

16. The system of claim 15, wherein the collective analysis of the plurality of object classifications is based at least on one or more of:
- an identification of a most frequent same object classification among the plurality of object classifications;
- a weighted average of the plurality of object classifications;
- respective degrees of confidence of the one or more learning models;
- a first amount of coverage of one or more camera images of the sensor data;
- a second amount of coverage of one or more LIDAR point clouds of the sensor data;
- a first coverage density of the one or more camera images; or
- a second coverage density of the one or more LIDAR point clouds.

17. The system of claim 15, wherein the plurality of object classifications includes one or more of: buildings, roads, sidewalks, fences, poles, traffic signs, vegetation, terrain, bicycles, vehicles, or pedestrians.

18. The system of claim 15, wherein the plurality of object classifications includes one or more of: colors or edges such that the classifying of the object includes one or more of colors or edges of the object.

19. The system of claim 15, wherein the operations further comprise providing map data corresponding to the map to a vehicle traversing the region to facilitate localization of the vehicle.

20. The system of claim 15, wherein the operations further comprise removing a depiction of the object from a map based at least on the object class corresponding to a dynamic object.

\* \* \* \* \*